United States Patent [19]
Knauseder et al.

[11] 4,089,891
[45] May 16, 1978

[54] PLEUROMUTILIN SOLVATES

[75] Inventors: Franz Knauseder, Wörgl; Helmut Wagner, Kramsach, both of Austria

[73] Assignee: Biochemie, Vienna, Austria

[21] Appl. No.: 706,066

[22] Filed: Jul. 16, 1976

[30] Foreign Application Priority Data
Jul. 23, 1975 Switzerland .......... 9623/75

[51] Int. Cl.$^2$ .............. C07C 69/67
[52] U.S. Cl. .............. 560/188; 560/150
[58] Field of Search .......... 260/484 R, 488 B

[56] References Cited
U.S. PATENT DOCUMENTS
3,979,423  9/1976  Riedl ................ 260/488 B

*Primary Examiner*—Vivian Garner
*Attorney, Agent, or Firm*—Gerald D. Sharkin; Robert S. Honor; Thomas O. McGovern

[57] ABSTRACT

The invention provides novel pleuromutilin solvates and a method of purifying pleuromutilin via such solvates.

5 Claims, No Drawings

PLEUROMUTILIN SOLVATES

The invention relates to solvates of pleuromutilin and to a method of purifying pleuromutilin via such solvates.

More particularly, this invention provides solvates of pleuromutilin with halogenated hydrocarbons.

As used herein, halogen means fluorine, chlorine, bromine and iodine, chlorine being preferred.

The preferred hydrocarbons are derived from aliphatic hydrocarbons, in particular alkanes or alkenes, more preferably alkanes. The aliphatic hydrocarbons suitably contain at least 2, preferably 2 to 6, in particular 2 to 3 carbon atoms. The hydrogen atoms on such hydrocarbons may be wholly or partially replaced by halogen atoms. For example, the halogenated hydrocarbons, in particular halogenated alkanes of 2 to 6, more particularly 2 to 3 carbon atoms, may suitably contain 1, 2, 3, 4 or 5 halogen atoms. Where the halogenated hydrocarbons contain more than one halogen atom, the halogen atoms are preferably the same.

Examples of suitable halogenated hydrocarbons include 1,1,1-trichloroethane, 1,1-dichloroethane, 1,1,2,2-tetrachloroethane, pentachloroethane, 1-monochloropropane, 2-monochloropropane, 1,2-dichloropropane, 1,3-dichloropropane, 2,2-dichloropropane, and 1,2,3-trichloropropane, preferably 1,1,1-trichloroethane.

The solvates of the invention may be produced by reacting pleuromutilin with a halogenated hydrocarbon.

The process may, for example, be effected by mixing pleuromutilin, in particular a concentrate of crude pleuromutilin, with 5 to 100 times, in particular 10 to 50 times, the amount weight/volume of the halogenated hydrocarbon. The mixture is then suitably maintained at a temperature of from 25° to 150° C, preferably at a temperature from 15° to 30° C below the boiling point of the mixture, until the pleuromutilin is dissolved. The mixture is then suitably allowed to cool and is preferably cooled to +5° C or under, whereupon the resulting pleuromutilin solvate crystallises out.

In an alternative embodiment, the solvates may be produced by mixing the pleuromutilin, in particular crude pleuromutilin concentrate, with 5 to 15 times, in particular about 10 times, the amount (weight/volume) of the halogenated hydrocarbon, and maintaining the mixture at −10° to 25° C, perferably +5° C, for a period of, for example, 12 to 48 hours, such that the pleuromutilin goes into solution and then crystallises out as the solvate.

The resulting solvates may be isolated and purified using conventional techniques. For example, they may be washed with small quantities of the halogenated hydrocarbons from which they are formed, and dried, for example at 20° to 30° C.

The solvates of the invention may be converted into pleuromutilin by heating, for example at temperatures of from 40° to 100° C, preferably at temperatures below the melting point of the solvate.

The formation of the solvates of the invention therefore provide a means for purifying pleuromutilin, in particular crude pleuromutilin obtained by fermentation. The crude pleuromutilin may thus first be converted to a solvate as described and the solvate may then be isolated and converted back to pleuromutilin as described above.

Accordingly, the invention also provides a process for purifying crude pleuromutilin comprising reacting it with a halogenated hydrocarbon, isolating the resulting pleuromutilin solvate and converting this to pleuromutilin.

Pleuromutilin is a known antibiotic which is obtained in known manner by fermentation and may be extracted in known manner as a crude product.

Pleuromutilin is also the starting material in the production of a variety of known pleuromutilin derivatives, in particular esters, having for example, antibacterial activity. The purification process of the invention may therefore be employed as an initial step in the production of such pleuromutilin derivatives.

In particular, the invention also provides a process for the production of 14-desoxy-14-[2-(diethylaminoethyl)mercaptoacetoxy]mutilin, in free base or acid addition salt form, comprising the steps of a. purifying crude pleuromutilin by reacting it with a halogenated hydrocarbon, isolating the resulting pleuromutilin solvate, and converting this to pleuromutilin, b. reacting the resulting purified pleuromutilin with p-toluene sulfochloride, and c. reacting the resulting 14-desoxy-14-tosyloxyacetoxymutilin with diethylaminoethane thiol.

Step (a) of this process is carried out in manner described above.

Step (b) may be carried out in known manner, as, for example, described in United Kingdom patent specification No. 1,312,148, the contents of which are incorporated herein by reference, in particular Example 1 thereof.

Step (c) may also be carried out in known manner, as for example described in United Kingdom patent specification Nos. 1,410,505 and 1,410,506, the contents of which are hereby incorporated by reference, in particular Examples 1 and 2 of the latter.

The following Examples illustrate the invention.

EXAMPLE 1

25.3 g of crude pleuromutilin (78.0%) is dissolved in 250 ml of 1,1,1-trichloroethane and separated from insoluble impurities by filtration. After cooling the solution and maintaining at +2° C for 24 hours, the pleuromutilin solvate crystallises out and is filtered off, washed with 50 ml of cold 1,1,1-trichloroethane and dried at room temperature to yield 25.8 g of the solvate, m.p. 72°–73° C; $\alpha_D^{20}$ 24.5° (C = 5 in CHCl$_3$), having a pleuromutilin content of 70.8% (yield 92.7%). After 24 hours warming at 60° C, 18.3 g of pleuromutilin (94.5%), m.p. 163°–166° C, $\alpha_D^{20}$ = 31.2° (C = 5 in CHCl$_3$) is obtained from 24.5 g of the solvate.

EXAMPLE 2

20 g of pleuromutilin (91.0%) is dissolved in 300 ml of 1,1,1-trichloroethane by warming at 55° C. After filtration of the solution, and slow cooling and maintenance at +5° C for 48 hours, 22.5 g of the solvate, m.p. 73° C; $\alpha_D^{20}$ = 25.6° (C = 5 in CHCl$_3$), are obtained having a pleuromutilin content of 72.8%. After warming at 62° C for 24 hours, 14.8 g of pleuromutilin (98.0%), m.p. 165°–166° C; $\alpha_D^{20}$ = 33.8°, are obtained from 20 g of the solvate.

EXAMPLES 3 TO 12

In manner analogous to Example 1, using the indicated halogenated hydrocarbons, the indicated solvates may be obtained.

| solvent (20 ml) | Pleuromutilin introduced (g) | Solvate obtained | Pleuromutilin content of solvent in % | m.p. (° C) | alpha$_p^{20}$ C = 5 in CHCl$_3$ |
|---|---|---|---|---|---|
| 1,1-Dichloro-ethane | 2.00 | 2.17 | 80.3 | 75–82 | 27.4 |
| 1,1,2-Tri-chloroethane | 2.00 | 2.33 | 74.0 | 83–86 | 24.9 |
| 1,1,2,2-Tetrachloro-ethane | 2.00 | 2.58 | 68.0 | 95–102 | 24.1 |
| Pentachloro-ethane | 2.00 | 2.89 | 65.3 | 94–100 | 22.2 |
| 1-Monochloro-propane | 1.00 | 1.02 | 82.0 | 70–73 | 28.2 |
| 2-Monochloro-propane | 0.50 | 0.46 | 84.6 | 70–73 | 28.4 |
| 1,2-Dichloro-propane | 2.00 | 2.21 | 78.1 | 76–80 | 27.3 |
| 1,3-Dichloro-propane | 2.00 | 2.26 | 76.2 | 75–78 | 26.5 |
| 2,2-Dichloro-propane | 1.00 | 1.10 | 76.3 | 81–86 | 27.6 |
| 1,2,3-Tri-chloropropane | 2.00 | 2.63 | 71.0 | 94–97 | 24.1 |

The solvates of Examples 3 to 12 may be converted to pleuromutilin as described in Example 1 or 2.

What is claimed is:

1. A solvate of pleuromutilin with a halogenated aliphatic hydrocarbon, the mole ratio of pleuromutilin to halogenated aliphatic hydrocarbon in said solvate being about 1 to 1.

2. The solvate of claim 1 in which the halogenated aliphatic hydrocarbon is 1,1,1-trichloroethane.

3. A solvate according to claim 1 of pleuromutilin with an alkane or alkene of 2 to 6 carbon atoms halogenated with 1 to 5 halogen atoms, the mole ratio of pleuromutilin to alkane or alkene in said solvate being about 1 to 1.

4. A solvate according to claim 3 of pleuromutilin with an alkane of 2 to 3 carbon atoms.

5. A solvate according to claim 4 in which the alkane is selected from the group consisting of 1,1-dichloroethane, 1,1,2-trichloroethane, 1,1,2,2-tetrachloroethane, pentachloroethane, 1-monochloropropane, 2-monochloropropane, 1,2-dichloropropane, 1,3-dichloropropane, 2,2-dichloropropane and 1,2,3-trichloropropane.

* * * * *